(12) United States Patent
Jackson (10) Patent No.: US 11,823,000 B1
(45) Date of Patent: Nov. 21, 2023

(54) BARCODE SCANNER FOR USE WITH A PARCEL DELIVERY SYSTEM

(71) Applicant: Richard Jackson, Lawrenceville, GA (US)

(72) Inventor: Richard Jackson, Lawrenceville, GA (US)

( * ) Notice: Subject to any disclaimer, the term of this patent is extended or adjusted under 35 U.S.C. 154(b) by 0 days.

(21) Appl. No.: 17/963,242

(22) Filed: Oct. 11, 2022

(51) Int. Cl.
  *G06K 7/10* (2006.01)
  *G06K 7/14* (2006.01)

(52) U.S. Cl.
  CPC ....... *G06K 7/10881* (2013.01); *G06K 7/1413* (2013.01); *G06K 2007/10524* (2013.01)

(58) Field of Classification Search
  CPC .. G06K 7/10881; G06K 7/1413; G06K 7/109; G06K 2007/10524
  USPC ............ 235/462.45, 462.43, 462.49, 472.01, 235/462.01, 375
  See application file for complete search history.

(56) References Cited

U.S. PATENT DOCUMENTS

| | | |
|---|---|---|
| 7,778,773 B2 | 8/2010 | Yaqub |
| 10,387,824 B2 | 8/2019 | Gillen |
| D945,422 S | 3/2022 | Hackett |
| 2001/0055978 A1* | 12/2001 | Herrod ................... G06F 1/163 455/403 |
| 2003/0006998 A1* | 1/2003 | Kumar .................. G06F 1/1626 715/700 |
| 2009/0326971 A1 | 12/2009 | Piccinini |
| 2013/0153658 A1* | 6/2013 | Hopper .............. G06K 7/10316 29/601 |
| 2013/0179067 A1 | 7/2013 | Trowbridge |
| 2014/0180952 A1 | 6/2014 | Arunapuram |
| 2015/0186842 A1* | 7/2015 | Daniarov ........... G06Q 10/0838 705/341 |
| 2017/0046657 A1 | 2/2017 | Allen |

FOREIGN PATENT DOCUMENTS

WO       2012050932       4/2012

* cited by examiner

*Primary Examiner* — Edwyn Labaze
(74) *Attorney, Agent, or Firm* — Kyle A. Fletcher, Esq.

(57) ABSTRACT

The barcode scanner for use with a parcel delivery system is an interface device. The barcode scanner for use with a parcel delivery system is configured for use in delivering packages. The barcode scanner for use with a parcel delivery system forms a wireless communication link with an appropriate authority. The barcode scanner for use with a parcel delivery system reads a bar code that appears on a package. The barcode scanner for use with a parcel delivery system transmits the read bar code and the location of the package to the appropriate authority. The appropriate authority logs the delivery of the package with the bar code. The appropriate authority transmits to the barcode scanner for use with a parcel delivery system the operational details about the next assigned delivery location.

14 Claims, 5 Drawing Sheets

BARCODE SCANNER FOR USE WITH A PARCEL DELIVERY SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of logistics. (G06Q10/08)

SUMMARY OF INVENTION

The barcode scanner for use with a parcel delivery system is an interface device. The barcode scanner for use with a parcel delivery system is configured for use in delivering packages. The barcode scanner for use with a parcel delivery system forms a wireless communication link with an appropriate authority. The barcode scanner for use with a parcel delivery system reads a bar code that appears on a package. The barcode scanner for use with a parcel delivery system transmits the read bar code and the location of the package to the appropriate authority. The appropriate authority logs the delivery of the package with the bar code. The appropriate authority transmits to the barcode scanner for use with a parcel delivery system the operational details about the next assigned delivery location.

These together with additional objects, features and advantages of the barcode scanner for use with a parcel delivery system will be readily apparent to those of ordinary skill in the art upon reading the following detailed description of the presently preferred, but nonetheless illustrative, embodiments when taken in conjunction with the accompanying drawings.

In this respect, before explaining the current embodiments of the barcode scanner for use with a parcel delivery system in detail, it is to be understood that the barcode scanner for use with a parcel delivery system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the barcode scanner for use with a parcel delivery system.

It is therefore important that the claims be regarded as including such equivalent construction insofar as they do not depart from the spirit and scope of the barcode scanner for use with a parcel delivery system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
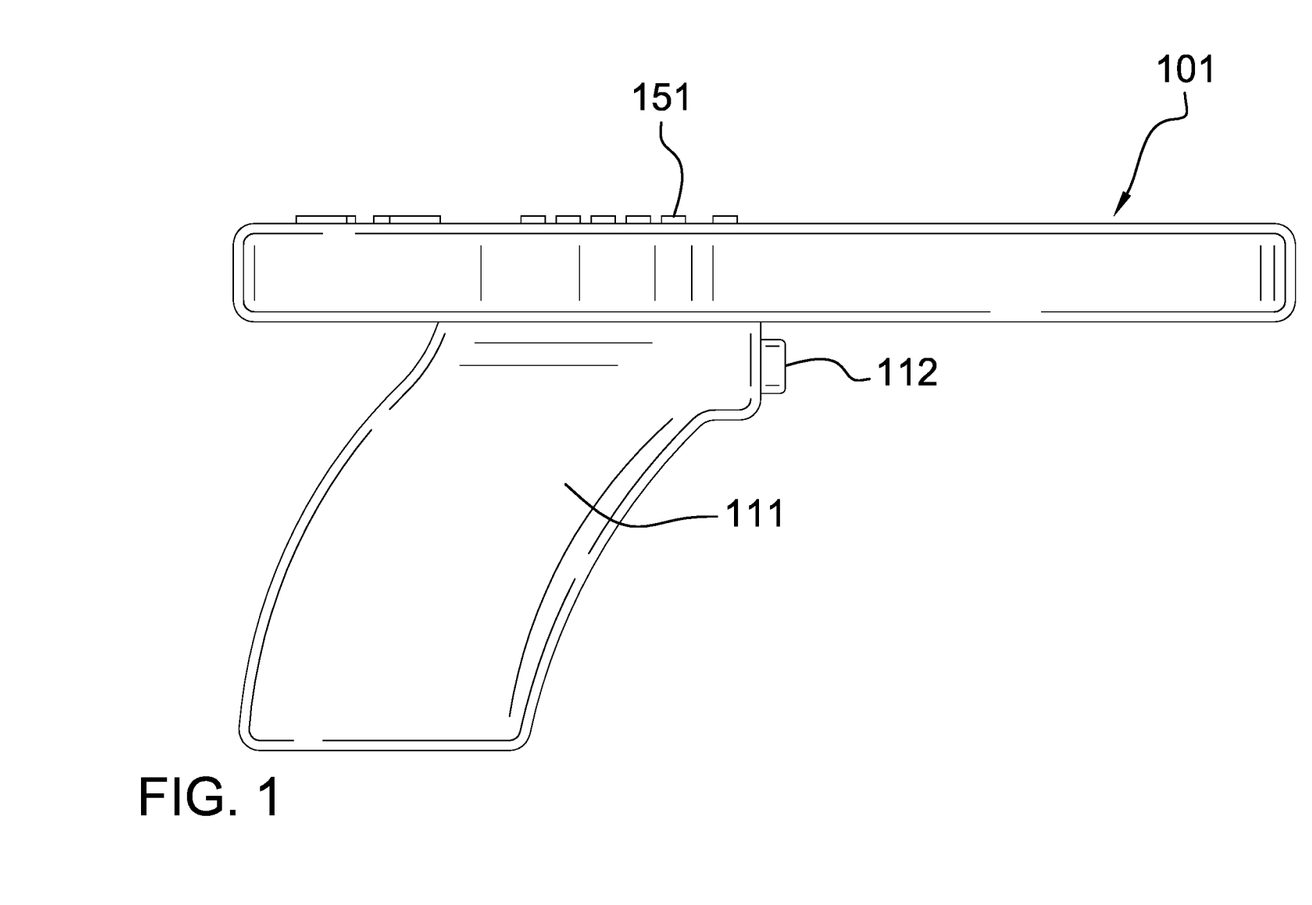
FIG. 1 is a side view of an embodiment of the disclosure.
Figure 2:
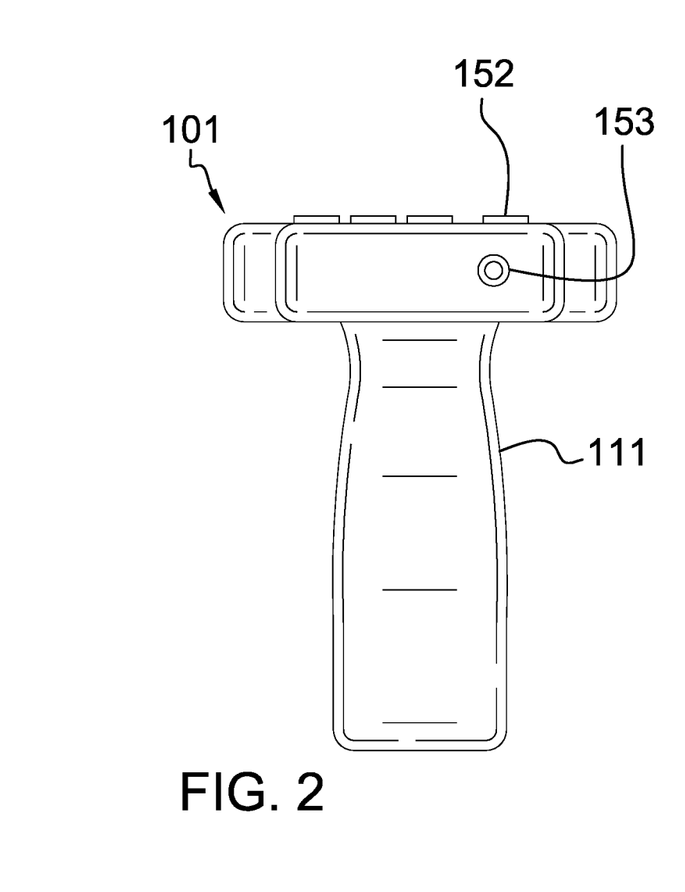
FIG. 2 is a rear view of an embodiment of the disclosure.
Figure 3:
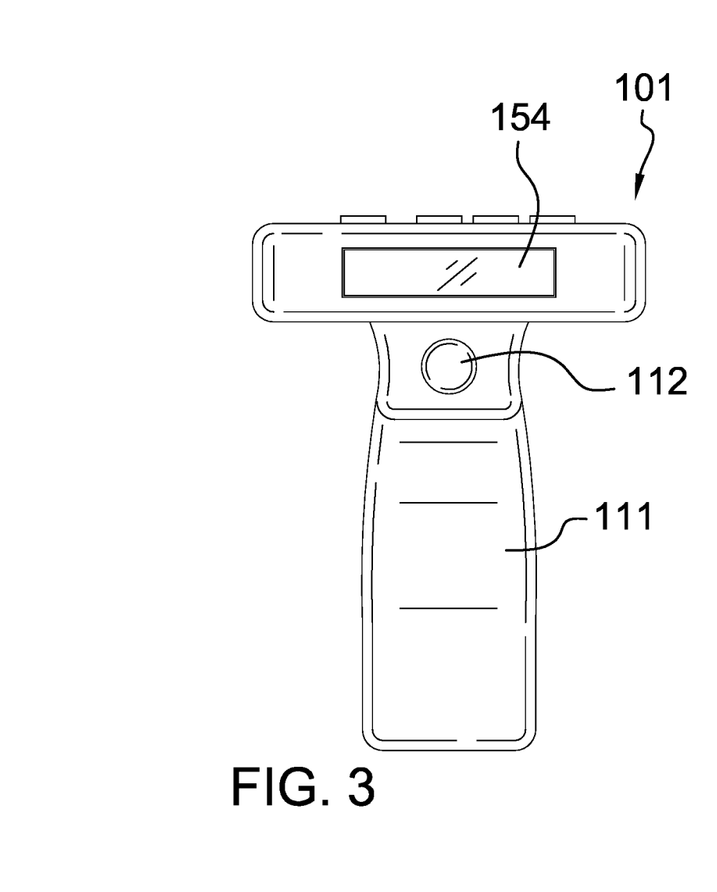
FIG. 3 is a front view of an embodiment of the disclosure.
Figure 4:
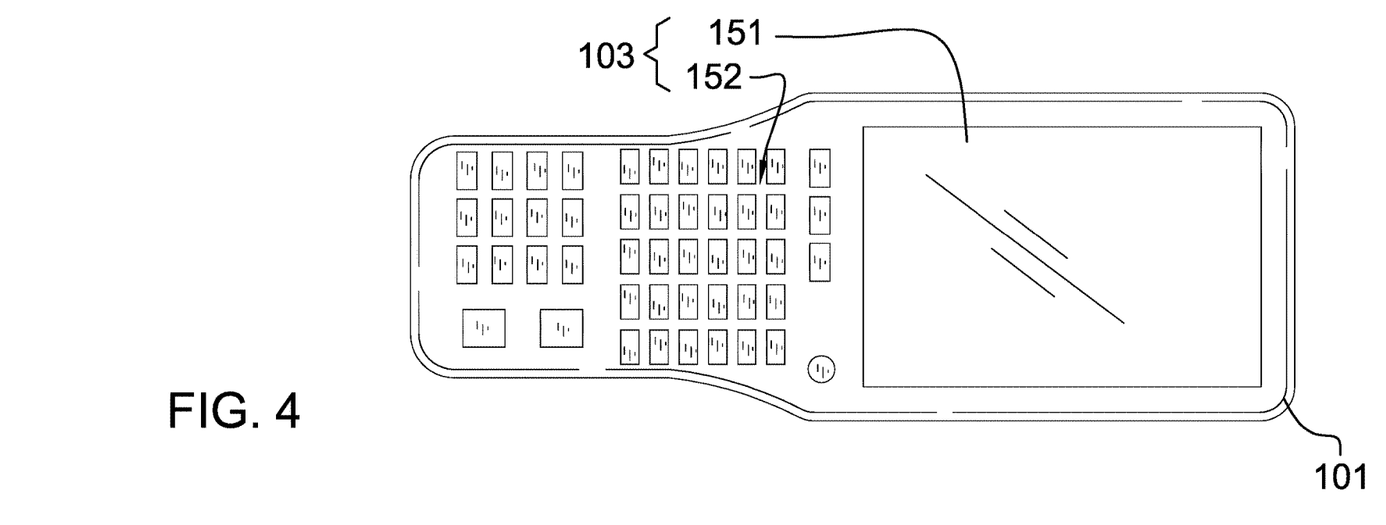
FIG. 4 is a top view of an embodiment of the disclosure.
Figure 5:
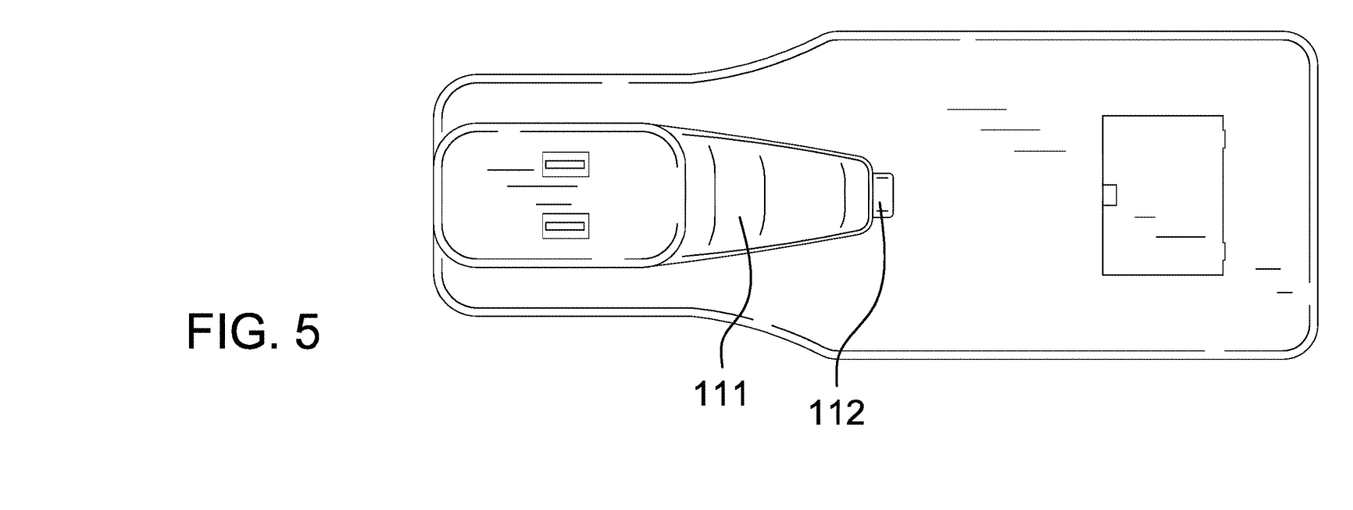
FIG. 5 is a bottom view of an embodiment of the disclosure.
Figure 6:
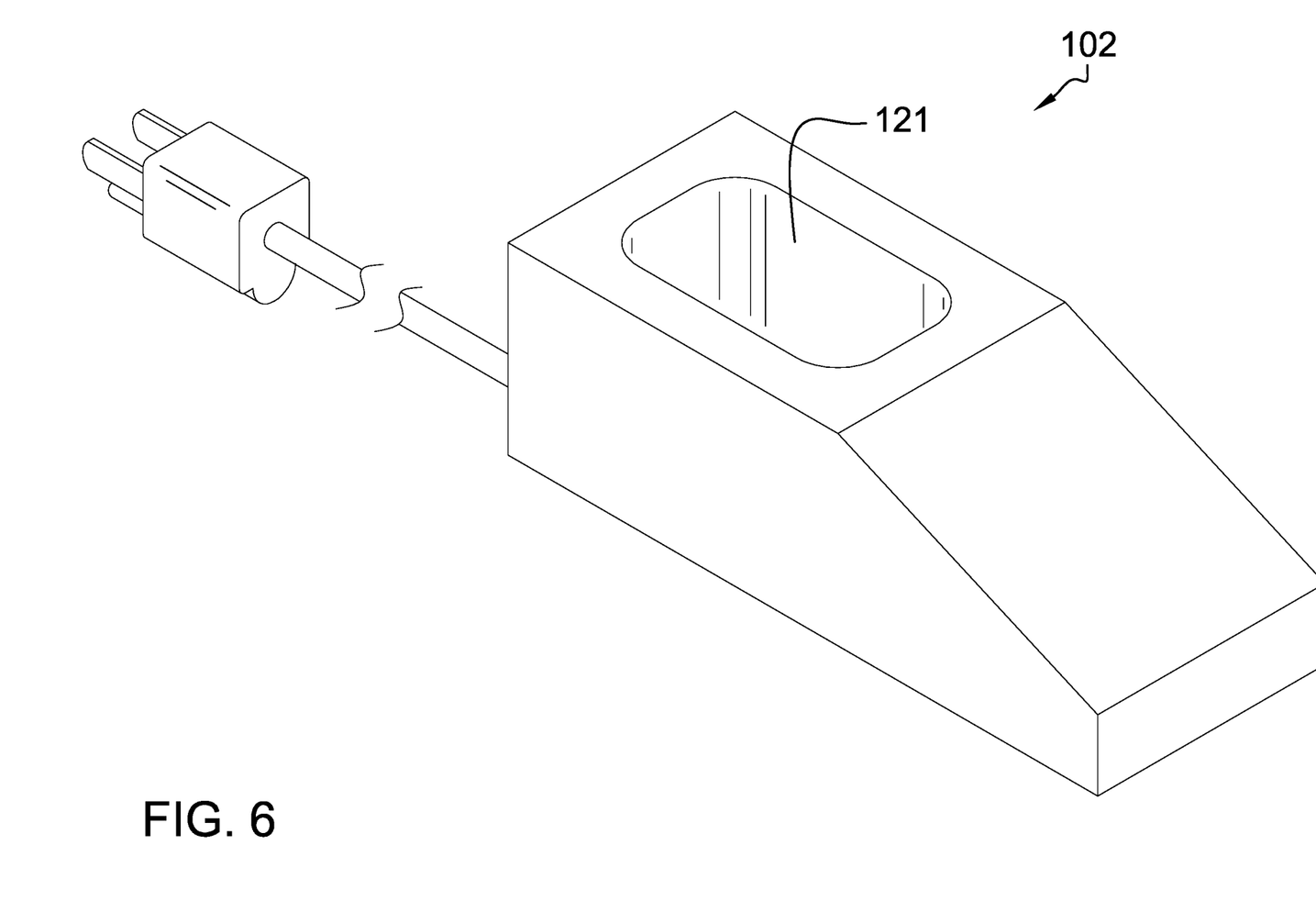
FIG. 6 is a detail view of an embodiment of the disclosure.
Figure 7:
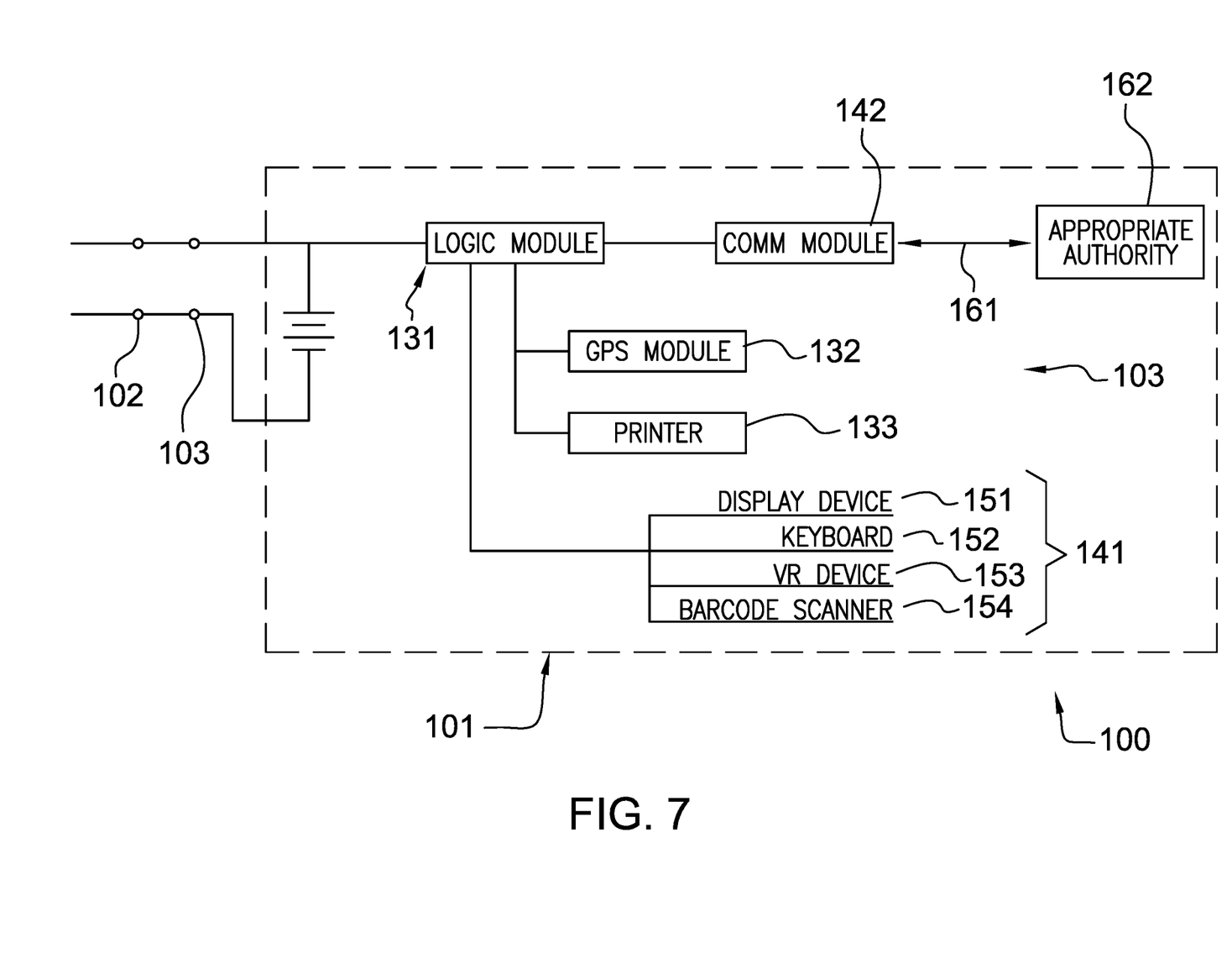
FIG. 7 is a schematic view of an embodiment of the disclosure.

Detailed reference will now be made to one or more potential embodiments of the disclosure, which are illustrated in FIGS. 1 through 7.

The barcode scanner for use with a parcel delivery system 100 (hereinafter invention) is an interface device. The invention 100 is configured for use in delivering packages. The invention 100 forms a wireless communication link with an appropriate authority 162. The invention 100 reads a bar code that appears on a package. The invention 100 transmits the read bar code and the location of the package to the appropriate authority 162. The appropriate authority 162 logs the delivery of the package with the bar code. The appropriate authority 162 transmits to the invention 100 the operational details about the next assigned delivery location.

The invention 100 comprises a scanner housing 101, a charger housing 102, and a control circuit 103. The scanner housing 101 contains the control circuit 103. The scanner housing 101 inserts into the charger housing 102.

The scanner housing 101 is a rigid structure. The scanner housing 101 contains the control circuit 103. The scanner housing 101 is formed with all apertures and form factors necessary to allow the scanner housing 101 to control circuit 103. The scanner housing 101 further comprises a scanner grip 111.

The scanner grip 111 is a pistol grip. The pistol grip is defined elsewhere in this disclosure. The scanner grip 111 attaches to the scanner housing 101. The scanner grip 111 allows the scanner housing 101 to be carried and manipulated. The scanner grip 111 further comprises a trigger switch 112.

The trigger switch 112 is an electric switch. The trigger switch 112 mounts on the scanner grip 111 such that the trigger switch 112 is accessible from the environment external to the scanner grip 111. The trigger switch 112 electrically connects to the control circuit 103. The control circuit 103 monitors the trigger switch 112. The trigger switch 112 signals the control circuit 103 to scan a bar code.

The charger housing 102 is a rigid structure. The charger housing 102 is an electrical interface that provide the electric energy necessary to charge the control circuit 103. The scanner housing 101 inserts into the charger housing 102 to form the electric connection that provides the control circuit 103 with the electric energy. The charger housing 102 is formed with all apertures and form factors necessary to allow the charger housing 102 to control circuit 103. The charger housing 102 further comprises a grip slot 121.

The grip slot 121 is a negative space that is formed in the charger housing 102. The grip slot 121 is geometrically similar to the scanner grip 111 of the scanner housing 101. The grip slot 121 is sized such that the scanner grip 111 inserts into the grip slot 121. The grip slot 121 positions the scanner grip 111 within the charger housing 102 such that the control circuit 103 form an electric connection to a source of electric energy.

The control circuit 103 is an electric circuit. The control circuit 103 tracks the location of the control circuit 103. The control circuit 103 forms a scanning device. The control circuit 103 scans a bar code. The control circuit 103 transmits the location of the control circuit 103 and the information from the scanned barcode to an appropriate authority 162. The control circuit 103 receives from the appropriate authority 162 the directions to the next delivery location. The control circuit 103 comprises a logic module 131, a gps module 132, and a printing device 133. The logic module 131, the gps module 132 and the printing device 133 are electrically interconnected.

The logic module 131 further comprises an interface structure 141 and a communication device 142. The communication device 142 further comprises a wireless communication link 161 and an appropriate authority 162. The logic module 131 is a programmable electronic device that is used to manage, regulate, and operate the control circuit 103. The communication module 142 is a wireless electronic communication device that allows the logic module 131 to wirelessly communicate with the appropriate authority 162. The communication module 142 forms the wireless communication link 161 between the logic module 131 and the appropriate authority 162. The communication module 142 exchanges one or more direct messaging facilities that are transmitted over the wireless communication link 161 to the appropriate authority 162. The message contained in the direct messaging facility contains the information derived by the bar code scan captured by the logic module 131 and operational communications between the control circuit 103 and the appropriate authority 162.

The interface structure 141 comprises a collection of devices that perform functions selected from the group consisting of: a) exchanging operational information between the logic module 131 and the appropriate authority 162; and, b) exchanging operational information between the logic module 131 and the environment surrounding the scanner housing 101. The interface structure 141 further comprises a display device 151, a keyboard 152, a voice recognition device 153, and a bar code scanner 154.

The display device 151 is an electrical device. The display device 151 electrically connects to the logic module 131. The logic module 131 controls the operation of the display device 151. The display device 151 displays an image that can be viewed from the environment surrounding the scanner housing 101. The image generated by the display device 151 displays operational data relevant to the individual operating the control circuit 103.

The keyboard 152 is an electrical device. The keyboard 152 electrically connects to the logic module 131. The logic module 131 monitors and controls the operation of the keyboard 152. The keyboard 152 is an interface device that allows operating information to be manually entered into the logic module 131 in a text based format.

The voice recognition device 153 is an electrical device. The voice recognition device 153 electrically connects to the logic module 131. The logic module 131 monitors and controls the operation of the voice recognition device 153. The voice recognition device 153 is an interface device that: a) captures voice commands from the environment surrounding the scanner housing 101; b) transmits the received voice command to the logic module 131. The logic module 131 determines whether the received voice command is legitimate. The logic module 131 interprets and implements any legitimately received voice commands.

The bar code scanner 154 is an electrical device. The bar code scanner 154 electrically connects to the logic module 131. The logic module 131 controls the operation of the bar code scanner 154. The bar code scanner 154 is a scanning device. The logic module 131 initiates the operation of the bar code scanner 154. The bar code scanner 154 captures an image of a bar code. The bar code scanner 154 transmits the captured image to the logic module 131. The logic module 131 converts the received image into a summary of operational information that is transmitted through a messaging facility to the appropriate authority 162.

The GPS module 132 is an electrical device that communicates with the GPS to determine the GPS coordinates of the GPS module 132. When queried by the logic module 131, the GPS module 132 transfers the GPS coordinates to the logic module 131.

The printing device 133 is a printer. The printing device 133 mounts in the scanner housing 101. The printing device 133 forms an electrical connection with the logic module 131. The logic module 131 controls the operation of the printing device 133. The printing device 133 is used to print: a) bar codes used to label received packages; and, b) to print receipts confirming the receipt of the package.

The following definitions were used in this disclosure:

Appropriate Authority: As used in this disclosure, an appropriate authority is a previously determined person, organization, or device that is designated to exchange information messages with a monitored device, system, or activity.

Bar Code: As used in this disclosure, a bar code is a machine readable coding scheme that converts text based information presented on an object into a machine readable format.

Bluetooth™: As used in this disclosure, Bluetooth™ is a standardized communication protocol that is used to wirelessly interconnect electronic devices.

Channel: As used in this disclosure, a channel is a previously determined frequency of electromagnetic radiation that is used for wireless communication. Wireless communication structures often designate a plurality of channels which allows users to "change the channel" when a previously specified channel is experiencing some form of interference.

Communication Link: As used in this disclosure, a communication link refers to the structured exchange of data between two objects.

Database: As used in this disclosure, a database refers to: 1) a set of data that is organized and stored in a manner that allows for the search and retrieval of data from the data set; or, 2) the electronic device that stores and organizes a data set as described in the first definition.

Display: As used in this disclosure, a display is a surface upon which is presented an image, potentially including, but not limited to, graphic images and text, that is interpretable by an individual viewing the projected image in a meaningful manner. A display device refers to an electrical device used to present these images.

Environment: As used in this disclosure, an environment refers to the physical conditions surrounding an object. The term environment is often limited to the physical conditions that the object interacts with.

GPS: As used in this disclosure, and depending on the context, GPS refers to: a) a system of navigational satellites that are used to determine the position, known as GPS coordinates, and velocity of a person or object; b) the system of navigational satellites referred to in the first definition that are used to synchronize to global time; or, c) an electronic device or that uses the system of navigational satellites referred to in the first definition to determine the position of a person or object. GPS is an acronym for Global Positioning System. Methods to determine the distance and direction between any two sets of GPS coordinates are well-known and documented in the navigational arts.

Grip: As used in this disclosure, a grip is an accommodation formed on or within an object that allows the object to be grasped or manipulated by a hand.

Handheld: As used in this disclosure, when referring to an item or device, handheld means that the item or device is small and light enough: 1) to be operated while a person holds the item or device in their hands; and, 2) to be carried by hand over a distance.

Handle: As used in this disclosure, a handle is an object by which a tool, object, or door is held or manipulated with the hand.

Housing: As used in this disclosure, a housing is a rigid structure that encloses and protects one or more devices.

Keyboard: As used in this disclosure, a keyboard is a panel that further comprises a plurality of buttons that are commonly referred to as keys. The keyboard is commonly used to operate devices including, but not limited to, logical devices and musical instruments.

Interface: As used in this disclosure, an interface is a physical or virtual boundary that separates two different systems and across which information is exchanged.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable.

Messaging Facility: As used in this disclosure, a messaging facility is a previously determined formatting structure through which a text or image (referred to in this definition as text) based communication is transmitted for delivery. A messaging facility is selected from the group consisting of a traditional messaging facility, a direct messaging facility and a broadcast messaging facility. A traditional messaging facility includes the delivery of a physical object containing the text based communication. The direct messaging facility includes communications that are addressed to a previously identified group of recipients. The broadcast messaging facility includes communications that are transmitted without the prior identification of the intended group of recipients. An example of a traditional messaging facility includes, but are not limited to, postal delivery. Examples of a direct messaging facilities include, but are not limited to, email and SMS messages. A social media service is an example of a broadcast messaging facility.

Microphone: As used in this disclosure, a microphone is a transducer that converts the energy from vibration into electrical energy. The sources of vibrations include, but are not limited to, acoustic energy.

Pistol Grip: As used in this disclosure, a pistol grip is a grip that: a) is intended to be grasped with one hand; and, b) has a form factor that is roughly geometrically similar to the shape of the hand gripping the pistol grip.

Printer: As used in this disclosure, a printer is a device that receives text or graphical output from a computer and transfers the information to paper.

Rigid Structure: As used in this disclosure, a rigid structure is a solid structure formed from an inelastic material that resists changes in shape. A rigid structure will permanently deform as it fails under a force. See bimodal flexible structure.

Roughly: As used in this disclosure, roughly refers to a comparison between two objects. Roughly means that the difference between one or more parameters of the two compared objects are not significantly different.

Scanning Device: As used in this disclosure, a scanning device is a device that captures images and converts them into a digital data format.

Transducer: As used in this disclosure, a transducer is a device that converts a physical quantity, such as pressure or brightness into an electrical signal or a device that converts an electrical signal into a physical quantity.

Trigger: As used in this disclosure, a trigger is a subcomponent of a mechanism that: a) is used to activate a mechanism; and, b) returns to its original position (or state) after the mechanism has been activated.

WiFi™: As used in this disclosure, WiFi™ refers to the physical implementation of a collection of wireless electronic communication standards commonly referred to as IEEE 802.11x.

Wireless: As used in this disclosure, wireless is an adjective that is used to describe a communication link between two devices that does not require the use of physical cabling.

Wireless Communication Link: As used in this disclosure, a wireless communication link is a previously determined channel that is used to wirelessly exchange information between one or more transceivers.

Wireless Communication Establishment Technology: As used in this disclosure, a wireless communication establishment technology refers to technology that establishes a wireless communication link between a first logical device and a second logical device. Usually, the operation of a wireless communication establishment technology is initiated by the push of a button. An example of such a technology is the WiFi™ protected setup technology (WPS™).

With respect to the above description, it is to be realized that the optimum dimensional relationship for the various components of the invention described above and in FIGS. 1 through 7 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A barcode scanner for use with a parcel delivery system comprising
    a scanner housing, a charger housing, and a control circuit;
    wherein the scanner housing contains the control circuit;
    wherein the scanner housing inserts into the charger housing;
    wherein the barcode scanner for use with a parcel delivery system is an interface device;
    wherein the barcode scanner for use with a parcel delivery system is configured for use in delivering packages;
    wherein the barcode scanner for use with a parcel delivery system forms a wireless communication link with an appropriate authority;
    wherein the barcode scanner for use with a parcel delivery system reads a bar code that appears on a package;
    wherein the barcode scanner for use with a parcel delivery system transmits the read bar code and the location of the package to the appropriate authority;
    wherein the appropriate authority logs the delivery of the package with the bar code;
    wherein the appropriate authority transmits to the barcode scanner for use with a parcel delivery system the operational details about the next assigned delivery location.

2. The barcode scanner for use with a parcel delivery system according to claim 1
    wherein the scanner housing is a rigid structure;
    wherein the scanner housing contains the control circuit;
    wherein the charger housing is a rigid structure;
    wherein the charger housing is an electrical interface that provide the electric energy necessary to charge the control circuit;
    wherein the scanner housing inserts into the charger housing to form the electric connection that provides the control circuit with the electric energy.

3. The barcode scanner for use with a parcel delivery system according to claim 2
    wherein the scanner housing further comprises a scanner grip;
    wherein the scanner grip is a pistol grip;
    wherein the scanner grip attaches to the scanner housing;
    wherein the scanner grip allows the scanner housing to be carried and manipulated;
    wherein the scanner grip further comprises a trigger switch;
    wherein the trigger switch is an electric switch;
    wherein the trigger switch mounts on the scanner grip such that the trigger switch is accessible from the environment external to the scanner grip;
    wherein the trigger switch electrically connects to the control circuit.

4. The barcode scanner for use with a parcel delivery system according to claim 3
    wherein the charger housing further comprises a grip slot;
    wherein the grip slot is a negative space that is formed in the charger housing;
    wherein the grip slot is geometrically similar to the scanner grip of the scanner housing;
    wherein the grip slot is sized such that the scanner grip inserts into the grip slot;
    wherein the grip slot positions the scanner grip within the charger housing such that the control circuit form an electric connection to a source of electric energy.

5. The barcode scanner for use with a parcel delivery system according to claim 4
    wherein the control circuit is an electric circuit;
    wherein the control circuit tracks the location of the control circuit;
    wherein the control circuit forms a scanning device;
    wherein the control circuit scans a bar code;
    wherein the control circuit transmits the location of the control circuit and the information from the scanned barcode to the appropriate authority;
    wherein the control circuit receives delivery instructions from the appropriate authority.

6. The barcode scanner for use with a parcel delivery system according to claim 5
    wherein the control circuit comprises a logic module, a gps module, and a printing device;
    wherein the logic module, the gps module and the printing device are electrically interconnected.

7. The barcode scanner for use with a parcel delivery system according to claim 6
    wherein the logic module further comprises an interface structure and a communication device;
    wherein the communication device further comprises a wireless communication link;
    wherein the logic module is a programmable electronic device;
    wherein the communication module is a wireless electronic communication device
    wherein the communication module exchanges one or more direct messaging facilities that are transmitted over the wireless communication link to the appropriate authority;
    wherein the message contained in the direct messaging facility contains the information derived by the bar code scan captured by the logic module and operational communications between the control circuit and the appropriate authority.

8. The barcode scanner for use with a parcel delivery system according to claim 7 wherein the interface structure comprises a collection of devices that perform functions selected from the group consisting of: a) exchanging operational information between the logic module and the appropriate authority; and, b) exchanging operational information between the logic module and the environment surrounding the scanner housing.

9. The barcode scanner for use with a parcel delivery system according to claim 8
    wherein the interface structure further comprises a display device, a keyboard, a voice recognition device, and a bar code scanner;
    wherein the display device is an electrical device;
    wherein the display device electrically connects to the logic module;
    wherein the logic module controls the operation of the display device;
    wherein the keyboard is an electrical device;
    wherein the keyboard electrically connects to the logic module;

wherein the logic module monitors and controls the operation of the keyboard;

wherein the voice recognition device is an electrical device;

wherein the voice recognition device electrically connects to the logic module;

wherein the logic module monitors and controls the operation of the voice recognition device;

wherein the bar code scanner electrically connects to the logic module;

wherein the logic module controls the operation of the bar code scanner;

wherein the bar code scanner is a scanning device.

10. The barcode scanner for use with a parcel delivery system according to claim 9 wherein the display device displays an image that can be viewed from the environment surrounding the scanner housing;

wherein the image generated by the display device displays operational data relevant to the individual operating the control circuit.

11. The barcode scanner for use with a parcel delivery system according to claim 10 wherein the keyboard is an interface device that allows operating information to be manually entered into the logic module in a text based format.

12. The barcode scanner for use with a parcel delivery system according to claim 11 wherein the voice recognition device is an interface device that: a) captures voice commands from the environment surrounding the scanner housing; b) transmits the received voice command to the logic module;

wherein the logic module determines whether the received voice command is legitimate;

wherein the logic module interprets and implements any legitimately received voice commands.

13. The barcode scanner for use with a parcel delivery system according to claim 12 wherein the bar code scanner is an electrical device;

wherein the logic module initiates the operation of the bar code scanner;

wherein the bar code scanner captures an image of a bar code;

wherein the bar code scanner transmits the captured image to the logic module;

wherein the logic module converts the received image into a summary of operational information that is transmitted through a messaging facility to the appropriate authority.

14. The barcode scanner for use with a parcel delivery system according to claim 13 wherein the gps module is an electrical device that communicates with the gps to determine the gps coordinates of the gps module;

wherein when queried by the logic module, the gps module transfers the gps coordinates to the logic module.

\* \* \* \* \*